US011733689B2

(12) United States Patent
Shigemori

(10) Patent No.: US 11,733,689 B2
(45) Date of Patent: Aug. 22, 2023

(54) CONTROL SYSTEM, PROGRAMMABLE LOGIC CONTROLLER, AND INFORMATION PROCESSING METHOD

(71) Applicant: OMRON CORPORATION, Kyoto (JP)

(72) Inventor: Yutsuka Shigemori, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 66 days.

(21) Appl. No.: 17/595,793

(22) PCT Filed: Mar. 10, 2020

(86) PCT No.: PCT/JP2020/010281
§ 371 (c)(1),
(2) Date: Nov. 24, 2021

(87) PCT Pub. No.: WO2020/246095
PCT Pub. Date: Dec. 10, 2020

(65) Prior Publication Data
US 2022/0308574 A1 Sep. 29, 2022

(30) Foreign Application Priority Data
Jun. 3, 2019 (JP) ................................ 2019-103866

(51) Int. Cl.
*G05B 23/02* (2006.01)
(52) U.S. Cl.
CPC ............................... *G05B 23/0286* (2013.01)
(58) Field of Classification Search
None
See application file for complete search history.

(56) References Cited

U.S. PATENT DOCUMENTS

| 2006/0265182 A1 | 11/2006 | Sato et al. |
| 2007/0090178 A1 | 4/2007 | Fujii et al. |
| 2018/0217914 A1 | 8/2018 | Sawada et al. |

FOREIGN PATENT DOCUMENTS

| JP | 07-104833 A | 4/1995 |
| JP | 2004-038996 A | 2/2004 |

(Continued)

OTHER PUBLICATIONS

International Search Report for PCT/JP2020/010281 dated Jun. 9, 2020 [PCT/ISA/210].

(Continued)

*Primary Examiner* — Carlos R Ortiz Rodriguez
(74) *Attorney, Agent, or Firm* — Sughrue Mion, PLLC

(57) ABSTRACT

The PLC is provided that outputs assistance information for assisting elimination of a target abnormality by using abnormality history data having written thereto an abnormality log element containing type information, occurrence time, and elimination time of an abnormality and operation history data having written thereto an operation log element containing content information and execution time of an operation. The output unit extracts, from the abnormality history data, an abnormality log element containing the type information showing a type identical to a type of the target abnormality. The output unit extracts, from the operation history data, an operation log element containing the execution time falling within a period from the occurrence time to the elimination time contained in the abnormality log element thus extracted, and generates the assistance information based on the extracted operation log element.

17 Claims, 10 Drawing Sheets

(56) References Cited

FOREIGN PATENT DOCUMENTS

| | | | |
|---|---|---|---|
| JP | 2006-330774 | A | 12/2006 |
| JP | 2011-059809 | A | 3/2011 |
| JP | 2014-067262 | A | 4/2014 |

OTHER PUBLICATIONS

Written Opinion for PCT/JP2020/010281 dated Jun. 9, 2020 [PCT/ISA/237].
Communication dated Jun. 13, 2023 in European Application No. 20819338.3.

FIG.5

| SOURCE ID | FUNCTION ID | RESOURCE NAME | DATA NAME | EXECUTION TIME | LOCATION ID | USER ID |
|---|---|---|---|---|---|---|
| TOOL | CHANGE | MODE | PROGRAM | 2019/5/1 10:05:00 | NEAR PLC | USER_1 |
| ... | ... | ... | ... | ... | ... | ... |
| TOOL | WRITE | Variable1 | False | 2019/5/1 12:39:00 | NEAR PLC | USER_1 |

| TYPE INFORMATION | | OCCURRENCE TIME | ELIMINATION TIME |
|---|---|---|---|
| ABNORMALITY ID | ABNORMALITY SUB ID | | |
| error111 | aaa | 2019/5/1 10:00:00 | 2019/5/1 12:40:00 |
| error222 | bbb | 2019/5/3 16:11:30 | 2019/5/3 16:32:45 |
| ⋮ | ⋮ | ⋮ | ⋮ |
| error111 | aaa | 2019/6/1 15:15:00 | — |

Write/Variable1/False
↓
WRITE False TO Variable 1

CONTROL SYSTEM, PROGRAMMABLE LOGIC CONTROLLER, AND INFORMATION PROCESSING METHOD

CROSS REFERENCE TO RELATED APPLICATIONS

This application is a National Stage of International Application No. PCT/JP2020/010281 filed Mar. 10, 2020, claiming priority based on Japanese Patent Application No. 2019-103866 filed Jun. 3, 2019, the entire contents of each of which being herein incorporated by reference in their entireties.

TECHNICAL FIELD

The present disclosure relates to a control system, a programmable logic controller, and an information processing method.

BACKGROUND ART

Programmable logic controllers (PLC) are used to control various equipment and various devices installed in each equipment. Such a PLC monitors various abnormalities such as an abnormality in the PLC itself, an abnormality in equipment or machinery of control target, and an abnormality in a network, and makes a notification to the outside when any abnormality is detected.

Japanese Patent Laying-Open No. H07-104833 (PTL 1) discloses a monitoring system for monitoring generation and leakage of toxic gas. This monitoring system temporarily stores, in a storage means, processing that is executed by a worker when an abnormal state is detected by a detection means with the processing associated with the abnormal state, and reads and displays the processing when the same abnormal state as the previous abnormal state is detected.

CITATION LIST

Patent Literature

PTL 1: Japanese Patent Laying-Open No. H07-104833

SUMMARY OF INVENTION

Technical Problem

According to the technique described in PTL 1, processing executed by the worker when an abnormal state of a toxic gas is detected is explicitly stored as a manual for handling the abnormal state. This allows even a user with limited knowledge and experience to easily eliminate the abnormality by referring to the manual.

On the other hand, for the PLC, various abnormalities such as an abnormality in the PLC itself, an abnormality in equipment or machinery of control target, and an abnormality in a network may occur in parallel. Further, for example, when an abnormality in a network occurs, an operation not related to the abnormality (for example, an operation on the PLC itself) may be executed. This makes it difficult for the PLC to explicitly create, synchronously with the timing when any abnormality occurs, a manual for handling the abnormality. Therefore, the technique described in PTL 1 cannot be simply applied to the PLC.

The present disclosure has been made in view of the above-described problems, and it is therefore an object of the present disclosure to provide a control system, a programmable logic controller, and an information processing method that allow even a user with limited knowledge and experience to easily eliminate an abnormality.

Solution to Problem

According to an example of the present disclosure, a control system includes a programmable logic controller configured to control a control target. The programmable logic controller includes an abnormality detector configured to detect an abnormality in at least either the control target or the programmable logic controller, and a command processor configured to execute, upon receipt of an operation command, processing in accordance with the operation command. The control system includes a first writing unit, a second writing unit, and an output unit. The first writing unit is configured to write, for each abnormality detected by the abnormality detector, a first log element containing type information showing a type of the abnormality, an occurrence time of the abnormality, and an elimination time of the abnormality to first history data. The second writing unit is configured to write, for each operation command received by the command processor, a second log element containing content information showing details of the operation command and an execution time of processing executed in accordance with the operation command to second history data. The output unit is configured to output assistance information for assisting elimination of a target abnormality detected by the abnormality detector. The output unit extracts, from the first history data, one first log element containing the type information showing a type identical to a type of the target abnormality as a target log element. The output unit extracts, from the second history data, second log elements containing the execution time falling within a period from the occurrence time to the elimination time contained in the target log element. The output unit generates the assistance information based on the second log elements extracted.

Within a period from the occurrence time to elimination time of a past first log element containing the type information showing a type identical to a type of a detected abnormality, an operation of eliminating the abnormality is executed. Therefore, according to the above-described disclosure, the second log elements containing the execution time falling within the period include a second log element corresponding to the operation of eliminating the abnormality. This allows even a user (such as a worker or an observer) with limited knowledge and experience to easily eliminate the abnormality by referring to the assistance information.

In the above-described disclosure, the second log element contains transmission source identification information for identifying a transmission source of the operation command. The assistance information is information containing the content information and the transmission source identification information contained in each of the second log elements extracted, the content information and the transmission source identification information being arranged in chronological order based on the execution time.

According to this disclosure, the user can easily check the content information associated with a desired transmission source based on the transmission source identification information from output content information. This further allows the user to easily understand the order of operations for eliminating the abnormality.

In the above-described disclosure, the second log element contains transmission source identification information for identifying a transmission source of the operation command. The output unit narrows down the second log elements extracted to a second log element containing the transmission source identification information for identifying a target transmission source and generates the assistance information based on the second log element obtained as a result of the narrowing.

According to this disclosure, the user can easily check only the details of the operation associated with the target transmission source among the operations executed within the period from the occurrence time to elimination time of the past first log element containing the type information showing a type identical to the type of the target abnormality.

In the above-described disclosure, the output unit specifies, as the target transmission source, a transmission source identified by the transmission source identification information contained in a second log element containing the execution time latest among the second log elements extracted.

Among the extracted second log elements, the operation log element containing the latest execution time corresponds to an operation that is executed immediately before the elimination time of the target abnormality and is thus highly probable to be an operation executed to eliminate the target abnormality. According to the above-described disclosure, the transmission source identified by the transmission source identification information contained in the second log element is specified as the target transmission source. This allows the user to check only the operation that is highly probable to have been executed to eliminate the abnormality among the operations executed within the period from the occurrence time to elimination time of the past first log element containing the type information showing a type identical to the type of the target abnormality.

In the above-described disclosure, the output unit selects, from the first history data, at least one first log element that is different from the target log element extracted and contains the type information showing a type identical to the type of the target abnormality. The output unit selects, for each of the at least one first log element, a second log element from the second history data, the second log element containing the execution time earlier than and closest to the elimination time contained the first log element. The output unit specifies a transmission source represented by the transmission source identification information contained in the second log element selected as the target transmission source.

According to the above-described disclosure, the user can check only the details of the operation from the same transmission source as the operation executed immediately before elimination time of the past target abnormality. As described above, the operation executed immediately before the elimination time of the target abnormality is highly probable to be an operation executed to eliminate the target abnormality. This allows the user to check only the operation that is highly probable to have been executed to eliminate the abnormality among the operations executed within the period from the occurrence time to elimination time of the past first log element containing the type information showing a type identical to the type of the target abnormality.

In the above-described disclosure, the assistance information is information containing the content information contained in the second log elements obtained as a result of the narrowing, the content information being arranged in chronological order based on the execution time.

According to this disclosure, the user can easily understand the order of operations corresponding to the second log elements obtained as a result of the narrowing.

In the above-described disclosure, the transmission source identification information identifies, for example, at least one of a program that has generated the operation command, a location of a device that has transmitted the operation command, and a user that has transmitted the operation command.

In the above-described disclosure, when there is a plurality of first log elements each containing the type information showing a type identical to the type of the target abnormality in the first history data, the output unit extracts the latest first log element from the plurality of first log elements as the target log element.

According to this disclosure, the user can easily check the details of the operation recently executed to eliminate the target abnormality.

According to an example of the present disclosure, a programmable logic controller that controls a control target includes the abnormality detector, the command processor, the first writing unit, the second writing unit, and the output unit.

According to an example of the present disclosure, an information processing method is an information processing method applied to a control system including a programmable logic controller that controls a control target. The programmable logic controller includes an abnormality detector configured to detect an abnormality in at least either the control target or the programmable logic controller, and a command processor configured to execute, upon receipt of an operation command, processing in accordance with the operation command. The information processing method includes the first to third steps. The first step is a step of writing, for each abnormality detected by the abnormality detector, a first log element containing type information showing a type of the abnormality, an occurrence time of the abnormality, and an elimination time of the abnormality to first history data. The second step is a step of writing, for each operation command received by the command processor, a second log element containing content information showing details of the operation command and an execution time of processing executed in accordance with the operation command to second history data. The third step is a step of outputting assistance information for assisting elimination of a target abnormality detected by the abnormality detector. The third step includes a step of extracting, from the first history data, a first log element containing the type information showing a type identical to a type of the target abnormality as a target log element, a step of extracting, from the second history data, second log elements containing the execution time falling within a period from the occurrence time to the elimination time contained in the target log element, and a step of generating the assistance information based on the second log elements extracted.

According to the disclosure described above, even a user with limited knowledge and experience can easily eliminate an abnormality.

Advantageous Effects of Invention

According to the present disclosure, even a person with limited knowledge and experience can easily eliminate the abnormality.

BRIEF DESCRIPTION OF DRAWINGS

FIG. 5 is a diagram illustrating an example of operation history data.

DESCRIPTION OF EMBODIMENTS

Figure 1:
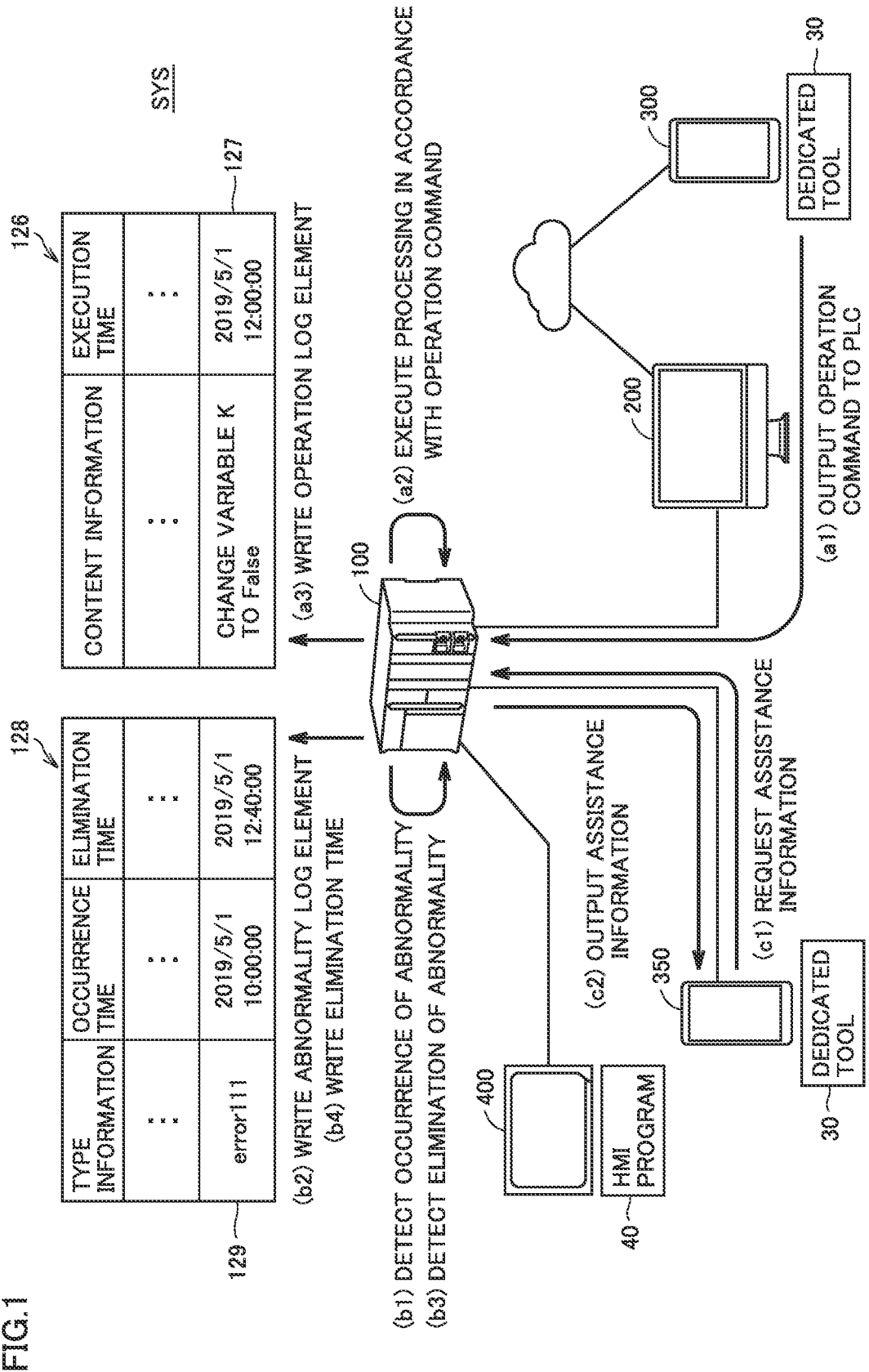
FIG. 1 is a diagram schematically illustrating an overall configuration of a control system according to an embodiment.

Embodiments of the present invention will be described in detail with reference to the drawings. Note that the same or corresponding parts in the drawings are denoted by the same reference numerals, and no redundant description will be given of such parts.

§ 1 Application Example

First, an example of a case to which the present invention is applied will be described. FIG. 1 is a diagram schematically illustrating an overall configuration of a control system according to an embodiment. A control system SYS illustrated in FIG. 1 includes a programmable logic controller (PLC) 100 that controls a control target, a support device 200, a terminal 300, 350, and a human machine interface (HMI) device 400.

PLC 100 controls a control target (such as a motor, a robot, a camera, or various sensors) installed in a production line. PLC 100 executes a control program designed in advance to control a connected control target (not illustrated).

PLC 100 executes, upon receipt of an operation command from terminal 300, 350 and HMI device 400, processing in accordance with the operation command.

PLC 100 detects various kinds of abnormalities such as an abnormality in the PLC itself, an abnormality in equipment or machinery of control target, and an abnormality in a network, and notifies, to terminal 300, 350 and HMI device 400, the occurrence of such an abnormality.

Support device 200 provides a development environment of the control program executed by PLC 100 and a development environment of an HMI program 40 executed by HMI device 400. Such a development environment is provided by a support program installed in support device 200.

The support program is, for example, "Sysmac Studio" made by OMRON Corporation. A user (designer) can design a control program for PLC 100 using the support program and install the control program thus designed in PLC 100. The user can design HMI program 40 for HMI device 400 using the support program and install HMI program 40 thus designed on HMI device 400.

HMI device 400 can be implemented by a personal computer. HMI device 400 executes HMI program 40 to present various types of information obtained as a result of a control operation executed by PLC 100 to the user (such as a worker or an observer) and generate an operation command directed to PLC 100 in accordance with an operation made by the user.

Terminal 300, 350 is used by the user (such as an operator or an observer) to present various types of information obtained as a result of a control operation executed by PLC 100 to the user and generate an operation command or the like directed for PLC 100 in accordance with an operation made by the user. Terminal 300, 350 is, for example, a mobile device such as a smartphone, a tablet, or a laptop computer. A communication system applied to communications between terminal 300, 350 and PLC 100 is not limited to any specific system. For example, terminal 300 is communicatively connected to PLC 100 via the cloud and support device 200. Terminal 350 is directly communicatively connected to PLC 100.

Terminal 300, 350 stores a program (hereinafter referred to as a "dedicated tool 30") for presenting various types of information received from PLC 100 and generating an operation command directed to PLC 100. Dedicated tool 30 is created in advance by, for example, a sales company of PLC 100 as an application dedicated to PLC 100. The user downloads dedicated tool 30 from a server to terminal 300, 350 in advance. Dedicated tool 30 obtains various types of information from PLC 100 in accordance with an operation made by the user and generates an operation command directed to PLC 100.

Control system SYS according to the present embodiment accumulates operation history data 126 and abnormality history data 128.

Operation history data 126 is data made up of operation log elements 127 accumulated for each operation command from terminal 300, 350 and HMI device 400. Operation log element 127 contains content information showing details of an operation command and an execution time of processing executed in accordance with the operation command.

In control system SYS, operation history data 126 is constructed according to the following steps (a1) to (a3):

Step (a1): Either terminal 300, 350 or HMI device 400 (terminal 300 in the example illustrated in FIG. 1) outputs an operation command to PLC 100;

Step (a2): PLC 100 executes processing in accordance with the operation command thus received; and Step (a3): PLC 100 generates operation log element 127 containing content information showing the details of the operation command and the execution time of the processing executed in accordance with the operation command associated with each other, and writes operation log element 127 thus generated to operation history data 126.

Abnormality history data 128 is data made up of abnormality log elements 129 accumulated for each abnormality detected by PLC 100. Abnormality log element 129 contains type information showing the type of an abnormality, the occurrence time of the abnormality, and the elimination time of the abnormality.

In control system SYS, abnormality history data 128 is constructed according to the following steps (b1) to (b4):

Step (b1): PLC 100 detects the occurrence of any abnormality;

Step (b2): PLC 100 generates abnormality log element 129 containing the type information showing the type of the abnormality that has occurred and the occurrence time of the abnormality associated with each other and writes abnormality log element 129 thus generated to abnormality history data 128;

Step (b3): PLC 100 detects elimination of the existing abnormality; and

Step (b4): PLC 100 writes the elimination time to abnormality log element 129 corresponding to the abnormality thus eliminated in abnormality history data 128.

Control system SYS according to the present embodiment executes, when an abnormality is detected, the following steps (c1), (C2):

Step (c1): Either terminal 300, 350 or HMI 400 (terminal 350 in the example illustrated in FIG. 1) that has received the notification of the occurrence of an abnormality requests PLC 100 to provide assistance information for assisting the elimination of the abnormality; and Step (c2): PLC 100 generates the assistance information based on operation history data 126 and abnormality history data 128 and outputs the assistance information thus generated.

Specifically, the foregoing step (c2) includes the following steps (c2-1) to (c2-3):

Step (c2-1): Past abnormality log element 129 containing type information showing a type identical to a type of the abnormality of which the occurrence has been notified is extracted from abnormality history data 128;

Step (c2-2): Operation log elements 127 containing the execution time falling within a period from the occurrence time to the elimination time contained in abnormality log element 129 thus extracted are extracted from operation history data 126; and Step (c2-3): Assistance information is generated based on operation log elements 127 thus extracted. For example, the assistance information is information containing the content information contained in the extracted operation log elements 127, the content information being arranged in chronological order based on the execution time.

Within a period from the occurrence time to elimination time of past abnormality log element 129 containing the type information showing a type identical to the type of the abnormality of which the occurrence has been notified, the operation of eliminating the abnormality is executed. That is, operation log elements 127 containing the execution time falling within the period includes operation log element 127 corresponding to the operation of eliminating the abnormality. This allows even a user (such as a worker or an observer) with limited knowledge and experience to easily eliminate the abnormality by referring to the assistance information.

§ 2 Specific Example

Next, a specific example of the control system according to the present embodiment will be described.

<A. Example of Hardware Configuration of PLC>

Figure 2:
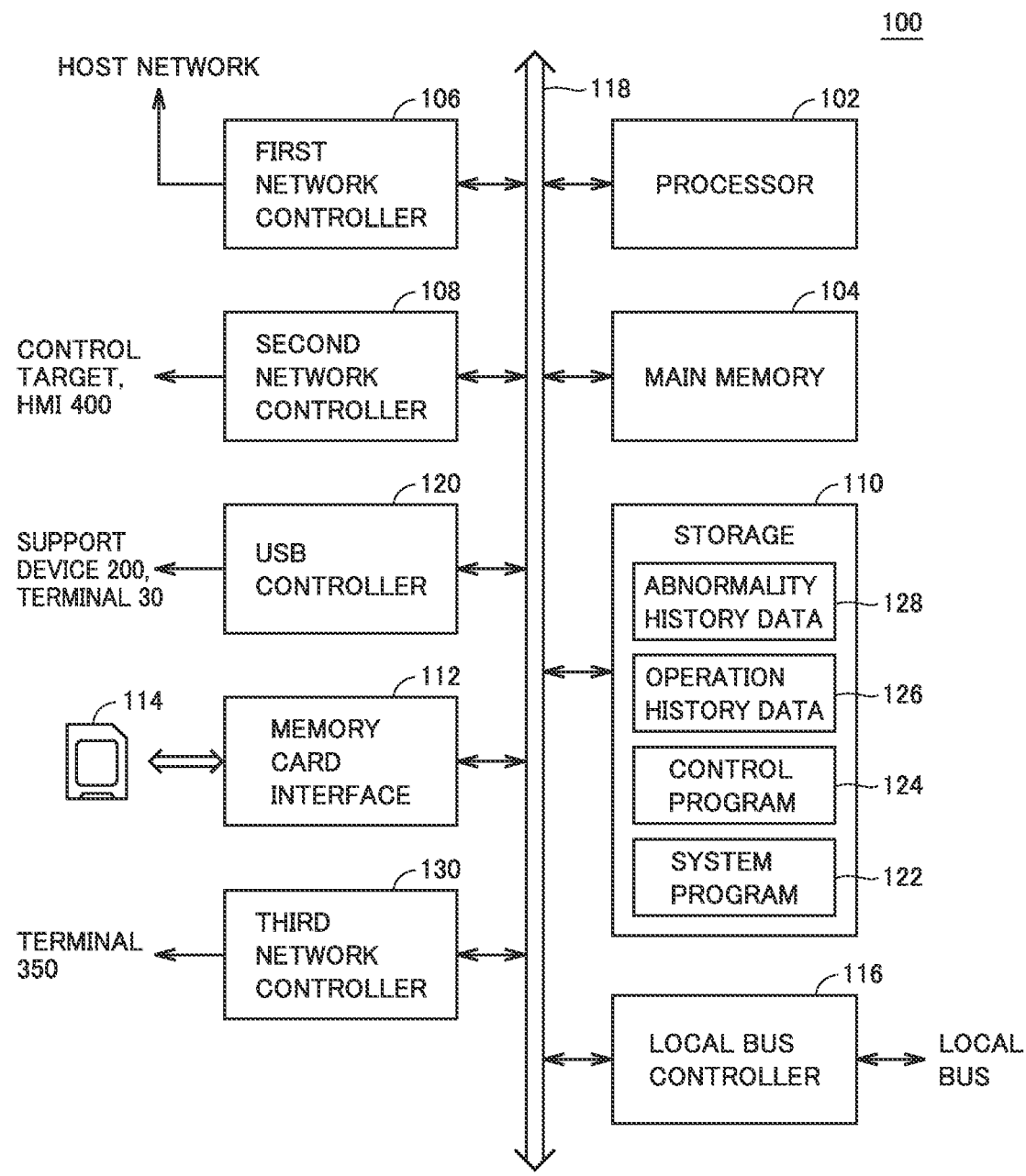
FIG. 2 is a diagram schematically illustrating an example of a hardware configuration of a PLC that is a part of the control system according to the present embodiment.

FIG. 2 is a diagram schematically illustrating an example of a hardware configuration of a PLC that is a part of the control system according to the present embodiment. As illustrated in FIG. 2, PLC 100 includes a processor 102, a main memory 104, a storage 110, a first network controller 106, a second network controller 108, a third network controller 130, a universal serial bus(USB)controller 120, a memory card interface 112, and a local bus controller 116. Such components are connected over a processor bus 118.

Processor 102 primarily serves as an operation processor that executes a control operation related to the control of the control target, and includes a central processing unit (CPU), a graphics processing unit (GPU), or the like. Specifically, processor 102 reads a program (for example, a system program 122 and a control program 124) stored in storage 110, loads the program into main memory 104, and executes the program, thereby enabling the control operation and various processing to be executed in a manner that depends on the control target.

Main memory 104 includes a volatile storage device such as a dynamic random access memory (DRAM) or a static random access memory (SRAM). Storage 110 includes, for example, a non-volatile storage device such as a hard disk drive (HDD) or a solid state drive (SSD).

Storage 110 stores various programs. The various programs include system program 122 for implementing a basic function and control program 124 created to adapt to the control target. Control program 124 is stored in storage 110 by support device 200 connected via USB controller 120. Storage 110 further stores operation history data 126 and abnormality history data 128.

First network controller 106, second network controller 108, and third network controller 130 are each responsible for exchanging data with any device over a network. First network controller 106, second network controller 108, and third network controller 130 may employ a general-purpose network protocol such as EtherNet.

For example, first network controller 106 exchanges data with a host device. Third network controller 130 exchanges data with terminal 350.

Second network controller 108 exchanges data with the control target and HMI device 400 over a field network. On the field network, a communication frame having a predetermined data structure is successively transferred at predetermined intervals, and processor 102 and each device write specified data to a specified area and read necessary data from a corresponding area of the communication frame thus successively transferred. Specifically, processor 102 sets a command directed to each device to the communication frame periodically transmitted. Each device reads a command directed to its own device from a received communication frame, and sets collected or generated data to a communication frame and transfers the communication frame. This allows processor 102 to check a returned communication frame to obtain data collected or generated by each device.

USB controller 120 exchanges data with support device 200 over a USB connection. USB controller 120 can also exchange data with terminal 300 via support device 200.

Memory card interface 112 receives memory card 114 that is an example of a removable recording medium. Memory card interface 112 can write data to memory card 114 and read various data (such as logs and trace data) from memory card 114.

Local bus controller 116 exchanges data with any unit connected to PLC 100 over a local bus.

FIG. 2 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of PLC 100 may be implemented by hardware having a general-purpose architecture (for example, an industrial personal computer based on a general-purpose personal computer). In such a case, a plurality of operating systems (OSs) having different uses may be executed in parallel using a virtualization technology, and a necessary application may be executed on each OS.

<B. Example of Functional Configuration of PLC>

Figure 3:
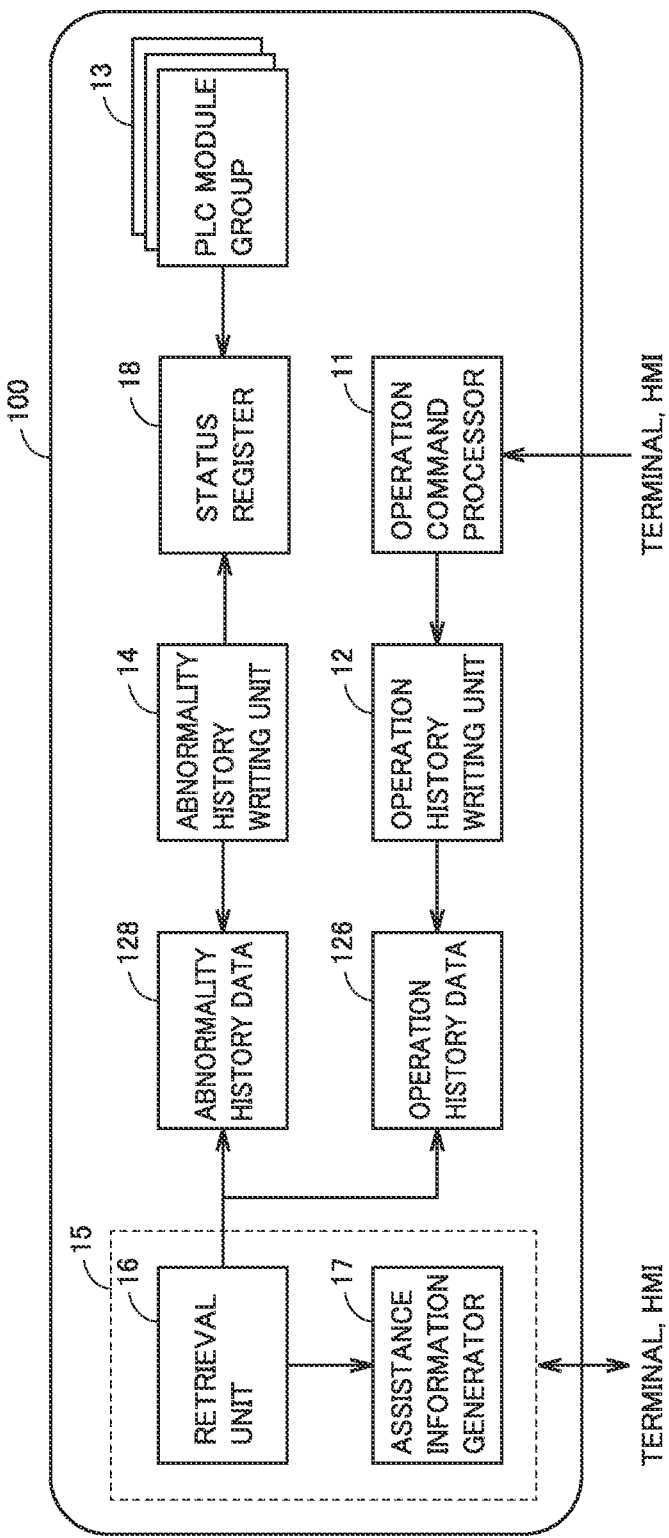
FIG. 3 is a diagram schematically illustrating an example of a functional configuration of the PLC that is a part of the control system according to the present embodiment.

FIG. 3 is a diagram schematically illustrating an example of a functional configuration of the PLC that is a part of the control system according to the present embodiment. PLC 100 in the example illustrated in FIG. 3 includes an operation command processor 11, an operation history writing unit 12, a PLC module group 13, an abnormality history writing unit 14, an output unit 15, and a status register 18. Operation command processor 11, operation history writing unit 12, PLC module group 13, abnormality history writing unit 14, and output unit 15 are implemented by various programs stored in storage 110 and executed by processor 102 illustrated in FIG. 2. Status register 18 is implemented by main memory 104 and storage 110 illustrated in FIG. 2.

<B-1. Operation Command Processor>

Operation command processor 11 executes, upon receipt of an operation command from either terminal 300, 350 or HMI device 400, processing in accordance with the operation command. The operation command is, for example, a packet compliant with a hypertext transfer protocol (HTTP).

Figure 4:
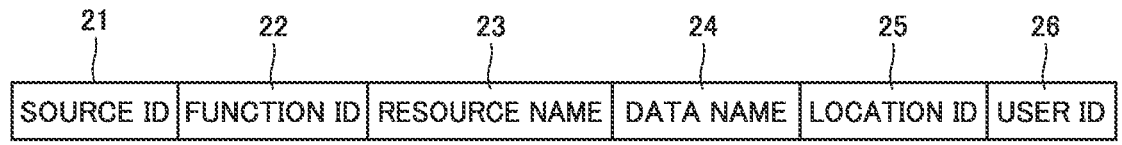
FIG. 4 is a diagram illustrating an example of fields making up an operation command.

FIG. 4 is a diagram illustrating an example of fields making up an operation command. The operation command in the example illustrated in FIG. 4 is made up of fields 21 to 26. Field 21 shows a source ID for identifying a program that has generated the operation command. The source ID identifies, for example, either dedicated tool 30 (see FIG. 1) or HMI program 40 (see FIG. 1). Field 22 shows a function ID for identifying the type of processing. The function ID identifies, for example, "CHANGE", "WRITE", or the like. Field 23 shows a resource name for identifying a resource that is a processing target. Field 24 shows a data name for identifying data applied to the processing target. Field 25 shows a location ID for identifying the location of a device that is a transmission source of the operation command. Field 26 shows a user ID for identifying a user (such as a worker or an observer) who is a transmission source of the operation command. Note that, in the operation command, at least either the location ID or the user ID may be omitted.

Terminal 300, 350 and HMI device 400 each generate an operation command by adding corresponding information to each of fields 21 to 26. Specifically, terminal 300, 350 sets a source ID for identifying dedicated tool 30 to field 21. HMI device 400 sets a source ID for identifying HMI program 40 to field 21. Terminal 300, 350 and HMI device 400 each generate a function ID, a resource name, and a data name based on input information, and set the function ID, resource name, and data name thus generated to fields 22, 23, and 24, respectively. Of terminal 300, 350 and HMI device 400, a device having a global positioning system (GPS) sensor generates a location ID based on latitude and longitude obtained using the GPS and sets the location ID thus generated to field 25. In general, terminal 300, 350 implemented by a smartphone or a tablet has a GPS sensor and thus can set the location ID to field 25. On the other hand, HMI device 400 generally has no GPS sensor and may generate an operation command without a location ID. Terminal 300, 350 and HMI device 400 set an ID of a logged-in user to field 26.

Operation command processor 11 has a buffer and stores a received operation command in the buffer. Operation command processor 11 reads, in a first-in first-out manner, an operation command stored in the buffer and executes processing in accordance with the operation command thus read.

<B-2. Operation History Writing Unit>

Returning to FIG. 3, every time operation command processor 11 executes processing in accordance with an operation command, operation history writing unit 12 generates operation log element 127 corresponding to the operation command, and writes operation log element 127 thus generated to operation history data 126. Operation log element 127 contains at least content information showing the details of the operation command and the execution time of the processing executed in accordance with the operation command.

FIG. 5 is a diagram illustrating an example of operation history data. As illustrated in FIG. 5, operation history data 126 contains operation log element 127 generated for each operation command. Operation log element 127 in the example illustrated in FIG. 5 is information containing a source ID 31, content information 38, an execution time 35, a location ID 36, and a user ID 37 associated with each other. Source ID 31, location ID 36, and user ID 37 serve as transmission source identification information for identifying a transmission source of a corresponding operation command. Content information 38 contains a function ID 32, a resource name 33, and a data name 34.

Operation history writing unit 12 only needs to generate operation log element 127 containing source ID 31, function ID 32, resource name 33, data name 34, location ID 36, and user ID 37 respectively having values set to fields 21 to 26 (see FIG. 4) of the operation command. Then, operation history writing unit 12 adds, to operation log element 127, execution time 35 of the processing executed in accordance with the operation command.

Note that operation history writing unit 12 may store in advance map information containing latitude and longitude associated with an area name (for example, "Shimogyo-ku, Kyoto") and convert the GPS information (latitude and longitude) set to field 25 of the operation command into the area name to generate location ID 36. Further, operation history writing unit 12 may store in advance a location (PLC installation location) where PLC 100 is installed and generate location ID 36 indicating "near the PLC" when a distance between the latitude and longitude set to field 25 of the operation command and the PLC installation location is less than a threshold.

Operation history writing unit 12 may set a time at which the processing in accordance with the operation command is started or ended as execution time 35. Alternatively, when a period from the reception of the operation command to the end of the processing executed in accordance with the operation command is short, operation history writing unit 12 may set the reception time of the operation command as execution time 35.

<B-3. PLC Module Group>

Returning to FIG. 3, PLC module group 13 includes a plurality of modules that perform control in accordance with various programs. For example, PLC module group 13 includes a module that monitors the operation of the control target, a module that monitors the network between the module and the control target, a module that monitors the operation in PLC 100, and the like.

Some modules belonging to PLC module group 13 operate as abnormality detectors that detect an abnormality in at least either control target or PLC 100. Such modules notify, when detecting an abnormality, the occurrence of the abnormality to terminal 300, 350 and HMI 400.

For example, the module that monitors the operation of the control target detects an abnormality in the control target by comparing a variable contained in a communication frame transmitted to and received from the control target with a threshold. Examples of the type of abnormality include an abnormality in a shaft of a motor, an abnormality in operation during return to origin of the motor, and a speed abnormality.

Further, the module that monitors the network with the control target detects an abnormality in communication by, for example, comparing a time from when the communication frame is transmitted to when the communication frame is returned with a threshold.

Furthermore, the module that monitors the operation in PLC 100 monitors the operation of processor 102 using, for example, a watchdog timer. The watchdog timer is periodically reset by processor 102, so that a count value of the watchdog timer is reset. When processor 102 malfunctions, the watchdog timer is not reset, and the count-up continues. Therefore, the module that monitors the operation in PLC 100 can detect an abnormality in the operation of processor 102 by comparing the count value of the watchdog timer with a threshold.

Status register 18 stores an abnormality flag corresponding to each of a plurality of types of abnormalities detectable by PLC module group 13. Each module belonging to PLC module group 13 updates, when an abnormality is detected, the abnormality flag corresponding to the abnormality to the ON state and updates, when the abnormality is eliminated, the abnormality flag corresponding to the abnormality to the OFF state.

<B-4. Abnormality History Writing Unit>

Abnormality history writing unit 14 periodically (for example, every 1 second) monitors each abnormality flag stored in status register 18. Abnormality history writing unit 14 generates abnormality log element 129 in accordance with a result of monitoring the abnormality flag and writes abnormality log element 129 thus generated to abnormality history data 128. Abnormality log element 129 contains type information showing the type of an abnormality, the occurrence time of the abnormality, and the elimination time of the abnormality.

When the abnormality flag is switched from the OFF state to the ON state, abnormality history writing unit 14 generates abnormality log element 129 containing the type information showing the type of the abnormality corresponding to the abnormality flag and the occurrence time of the abnormality associated with each other, and writes abnormality log element 129 thus generated to abnormality history data 128. Abnormality history writing unit 14 may set a timing at which the abnormality flag is switched from the OFF state to the ON state as the occurrence time of the abnormality.

When the abnormality flag is switched from the ON state to the OFF state, abnormality history writing unit 14 identifies latest abnormality log element 129 containing the type information showing the type of the abnormality corresponding to the abnormality flag from abnormality history data 128. Abnormality history writing unit 14 adds the elimination time to abnormality log element 129 thus identified. Abnormality history writing unit 14 may set a timing at which the abnormality flag is switched from the ON state to the OFF state as the elimination time.

Figures 6, 7:
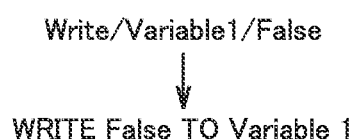
FIG. 6 is a diagram illustrating an example of abnormality history data.
FIG. 7 is a diagram illustrating an example of how to convert content information.

FIG. 6 is a diagram illustrating an example of the abnormality history data. As illustrated in FIG. 6, abnormality history data 128 contains abnormality log element 129 for each detected abnormality. Abnormality log element 129 in the example illustrated in FIG. 6 is information containing type information 41 containing an abnormality ID and an abnormality sub ID, an occurrence time 42, and an elimination time 43, type information 41, occurrence time 42, and elimination time 43 being associated with each other. The abnormality ID indicates a large classification of the type of abnormality, and the abnormality sub ID indicates a small classification of the type of abnormality. In the example illustrated in FIG. 6, abnormality log elements 129*a*, 129*z* contain the same type information 41 and correspond to the same abnormality. Note that elimination time 43 of abnormality log element 129*z* is blank. This is because a corresponding abnormality has not been eliminated (the abnormality continues).

<B-5. Output Unit>

Returning to FIG. 3, output unit 15, outputs, in response to a request from terminal 300, 350 and HMI device 400, the assistance information for assisting the elimination of a target abnormality. In general, a newly notified abnormality is specified as the target abnormality. Output unit 15 includes a retrieval unit 16 and an assistance information generator 17.

Retrieval unit 16 extracts, from abnormality history data 128, one abnormality log element 129 containing type information 41 (see FIG. 6) and the elimination time that satisfy conditions where type information 41 shows a type identical to the type of the target abnormality and the elimination time is not blank. When there is a plurality of abnormality log elements 129 satisfying the conditions, retrieval unit 16 extracts latest abnormality log element 129 from the plurality of abnormality log elements 129. Retrieval unit 16 extracts, from operation history data 126, operation log element 127 containing execution time 35 (see FIG. 5) falling within a period from occurrence time 42 to elimination time 43 of abnormality log element 129 thus extracted. Retrieval unit 16 outputs operation log element 127 thus extracted to assistance information generator 17.

Assistance information generator 17 generates assistance information based on operation log element 127 received from retrieval unit 16, and outputs the assistance information thus generated to a device that is the request source (either terminal 300, 350 or HMI device 400). This causes the assistance information to be displayed on the device that is the request source (either terminal 300, 350 or HMI device 400).

(B-5-1. First Generation Example of Assistance Information)

Assistance information generator 17 generates assistance information containing source ID 31, content information 38, location ID 36, and user ID 37 contained in operation log element 127 received from retrieval unit 16, source ID 31, content information 38, location ID 36, and user ID 37 being arranged in chronological order based on the execution time 35. Assistance information generator 17 may convert content information 38 into a format that can be easily understood by the user.

FIG. 7 is a diagram illustrating an example of how to convert content information. In the example illustrated in FIG. 7, assistance information generator 17 converts content information 38 into a sentence by suitably rearranging function ID 32, resource name 33, and data name 34 making up content information 38 and adding particles. This allows the user (such as a worker or an observer) to easily understand the details of an operation. Note that content information 38 may be converted by terminal 300, 350 and HMI device 400 that have received the assistance information rather than assistance information generator 17.

Figure 8:
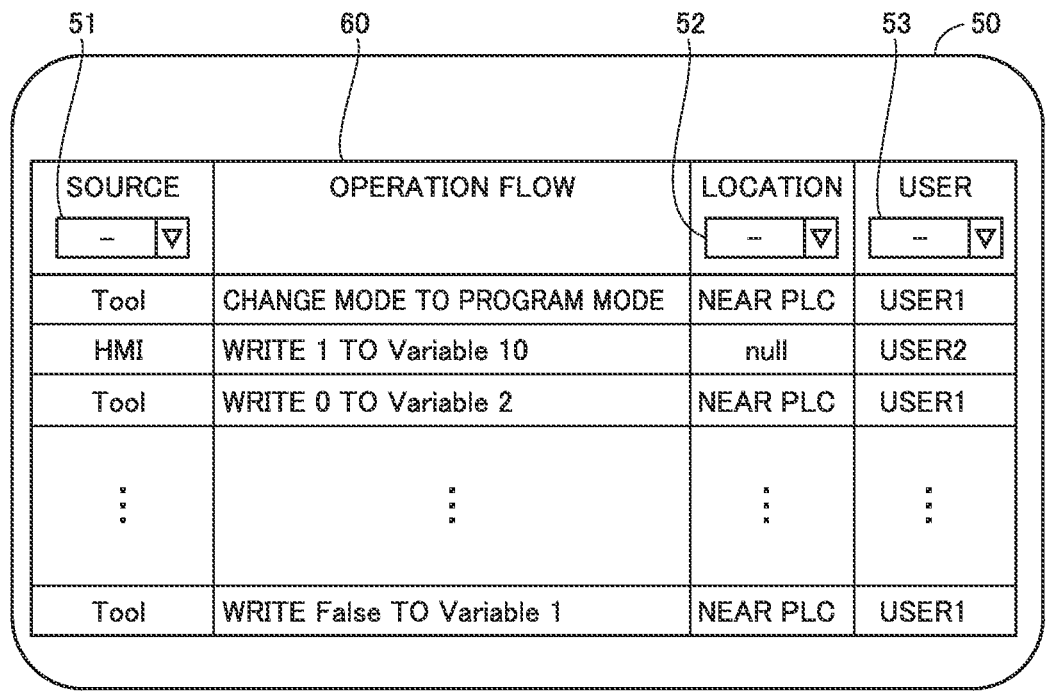
FIG. 8 is a diagram illustrating an example of a display screen of assistance information.

FIG. 8 is a diagram illustrating an example of a display screen of assistance information. The screen illustrated in FIG. 8 is displayed on the device (either terminal 300, 350 or HMI device 400) that has requested the assistance information.

A screen 50 in the example illustrated in FIG. 8 includes a list 60 of all operations executed within a period from the occurrence time to elimination time of abnormality log element 129 containing type information 41 showing a type identical to the type of the target abnormality. The operations executed within the period from the occurrence time to elimination time of the abnormality include an operation executed to eliminate the abnormality. This allows the user to easily execute the operation of eliminating an abnormality by referring to list 60.

Screen 50 in the example illustrated in FIG. 8 shows all operations executed within the period from the occurrence time to elimination time of an abnormality. The operations executed within the period may include an operation not related to the elimination of the abnormality. Therefore, screen 50 includes input fields 51 to 53 for narrowing down operations to be displayed. Input fields 51 to 53 are fields for inputting a source ID, a location ID, and a user ID, respectively.

When a source ID is input to input field 51, a screen including a list of operations associated with input source ID are displayed.

Figure 9:
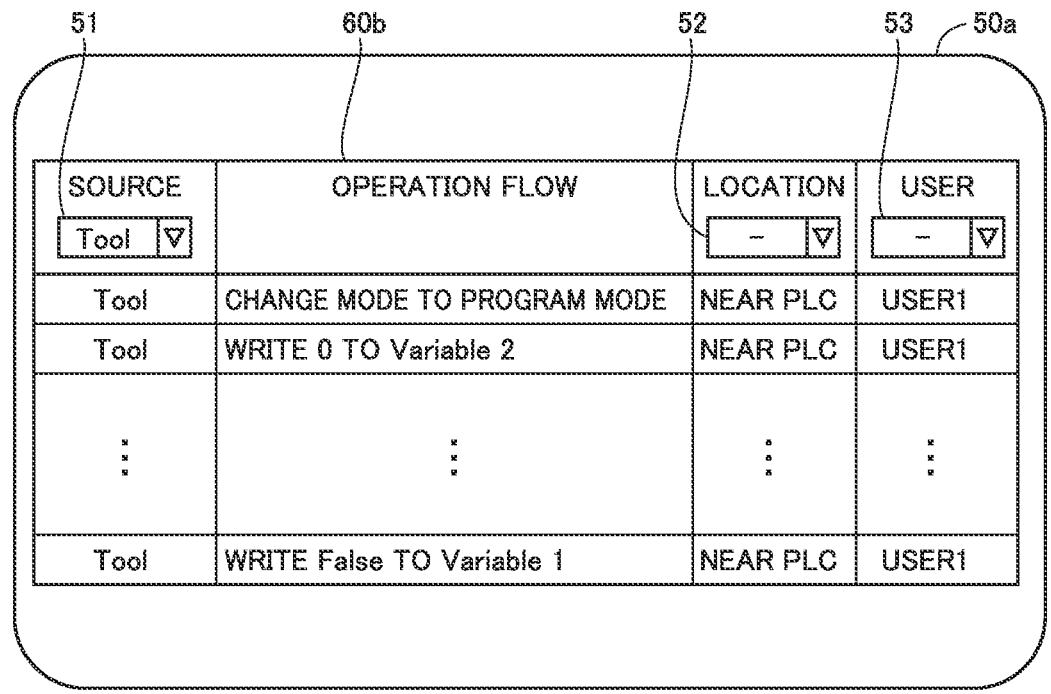
FIG. 9 is a diagram illustrating an example of a screen including a list of operations associated with an input source ID.

FIG. 9 is a diagram illustrating an example of a screen including a list of operations associated with an input source ID. A screen 50a illustrated in FIG. 9 is displayed when a source ID "Tool" indicating dedicated tool 30 is input to input field 51 in FIG. 8. Assistance information generator 17 specifies the source identified by the source ID input to input field 51 as a narrowing key. Assistance information generator 17 may narrow down operation log elements 127 received from retrieval unit 16 to operation log elements 127 containing source ID 31 for identifying the source serving as the narrowing key, and generate assistance information based on operation log elements 127 obtained as a result of the narrowing. As a result, a list 60a of operations associated with the input source ID is displayed.

Likewise, when a location ID is input to input field 52, operation log elements 127 received from retrieval unit 16 are narrowed down to operation log elements 127 containing location ID 36 identical to the location ID thus input. Then, a screen including a list of operations corresponding to operation log elements 127 obtained as a result of the narrowing is displayed. For example, the user may input a location ID "near PLC" to input field 52 based on the fact that the operation of eliminating an abnormality is normally executed near PLC 100.

When a user ID is input to input field 53, operation log elements 127 received from retrieval unit 16 are narrowed down to operation log elements 127 containing user ID 37 identical to the user ID thus input. Then, a screen including a list of operations corresponding to operation log elements 127 obtained as a result of the narrowing is displayed. For example, the user may input a user ID of a skilled worker to input field 53 based on the fact that the possibility of eliminating the abnormality by the skilled worker is high.

When IDs are input to at least two of input fields 51 to 53, assistance information generator 17 may narrow down operation log elements 127 received from retrieval unit 16 to operation log elements 127 containing IDs identical to the at least two input IDs (for example, the source ID and the user ID).

(B-5-2. Second Generation Example of Assistance Information)

In the first generation example described above, assistance information generator 17 first generates, as the assistance information, list 60 of all operations executed within the period from the occurrence time to elimination time of an abnormality. Subsequently, assistance information generator 17 narrows down operation log elements 127 in accordance with the inputs to input field 51 to 53 to regenerate the assistance information based on operation log elements 127 obtained as a result of the narrowing.

On the other hand, in the second generation example, assistance information generator 17 automatically narrows down operation log elements 127 received from retrieval unit 16 to operation log elements 127 presumed to be highly relevant to the elimination of the abnormality and generates the assistance information based on operation log elements 127 obtained as a result of the narrowing.

Figure 10:
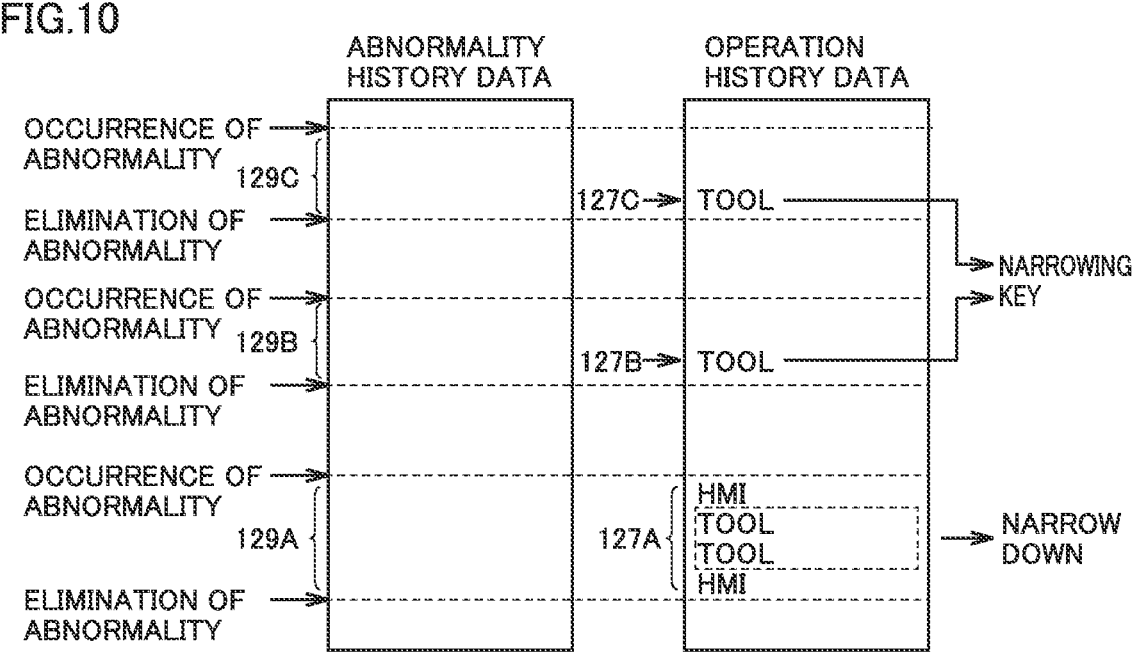
FIG. 10 is a diagram illustrating how to narrow down operation log elements.

FIG. 10 is a diagram illustrating how to narrow down operation log elements. In FIG. 10, an operation log element group 127A is a group of operation log elements received from retrieval unit 16. That is, operation log element group 127A is a group of operation log elements corresponding to operations executed within a period from the occurrence time to elimination time of latest abnormality log element 129A containing type information 41 and the elimination time that satisfy conditions where type information 41 shows a type identical to the type of the target abnormality and the elimination time is not blank.

Assistance information generator 17 selects, from abnormality history data 128, at least one abnormality log element that is different from abnormality log element 129A and contains type information 41 showing a type identical to the type of the target abnormality. In the example illustrated in FIG. 10, abnormality log elements 129B, 129C are selected.

For each of abnormality log elements 129B, 129C thus selected, assistance information generator 17 selects, from operation history data 126, an operation log element containing an execution time that is earlier than and closest to the elimination time contained in the abnormality log element. In the example illustrated in FIG. 10, operation log elements 127B, 127C are selected.

Assistance information generator 17 specifies a source represented by source IDs 31 contained in operation log elements 127B, 127C thus selected as the narrowing key. For example, a source that is the largest in number among sources identified by source IDs 31 contained in the selected operation log elements is specified as the narrowing key. In the example illustrated in FIG. 10, both source IDs 31 contained in operation log elements 127B, 127C are "Tool" for identifying dedicated tool 30. This causes assistance information generator 17 to specify dedicated tool 30 as the narrowing key.

In a case where there is a plurality of sources the largest in number among the sources identified by source IDs 31 contained in the selected operation log elements, assistance information generator 17 may specify one of the plurality of sources the largest in number (for example, a source identified by a source ID associated with latest execution time 35) as the narrowing key.

Assistance information generator 17 narrows down operation log elements 127 received from retrieval unit 16 to operation log elements 127 containing source ID 31 for identifying the source specified as the narrowing key. This allows assistance information generator 17 to generate the assistance information based on operation log elements 127 obtained as a result of the narrowing.

In the second generation example, screen 50*a* illustrated in FIG. 9 is first displayed. Subsequently, the list of operations is updated in accordance with the input to any of input fields 51 to 53 on screen 50*a*.

<C. Processing Flow>

Figure 11:
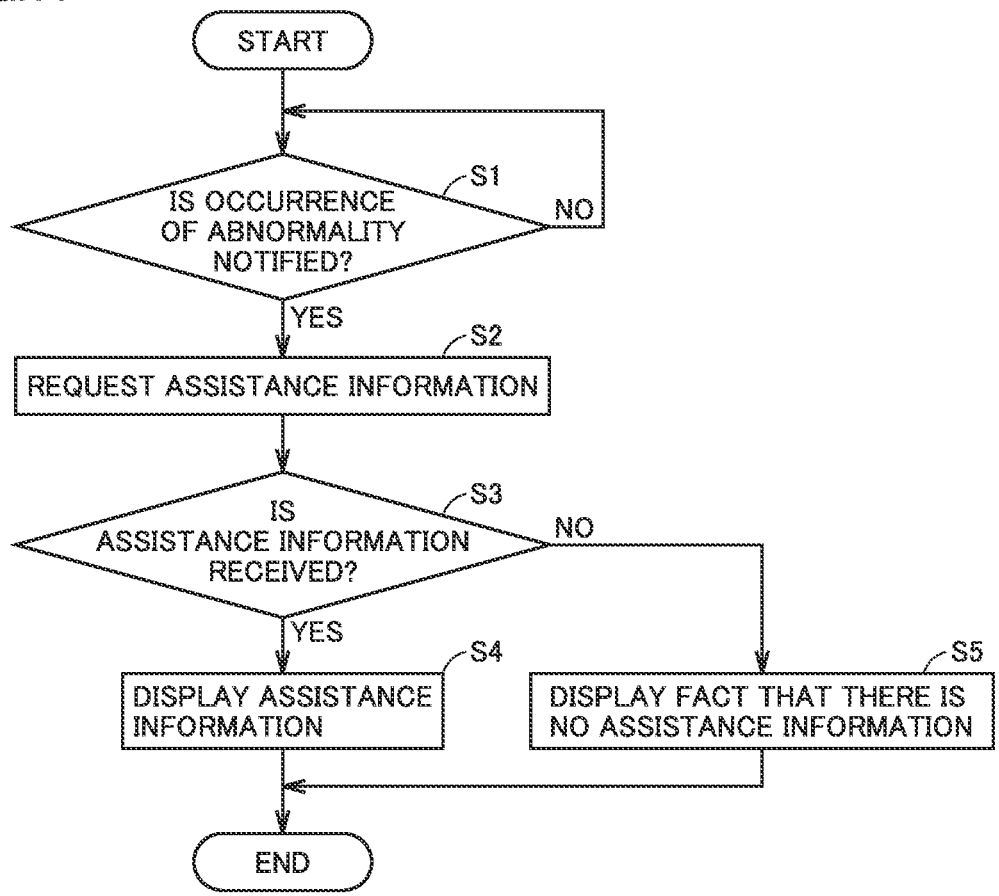
FIG. 11 is a flowchart illustrating a flow of processing of requesting and displaying the assistance information executed by a terminal and HMI device.

Next, a flow of processing of providing the assistance information will be described with reference to FIGS. 11 to 13. FIG. 11 is a flowchart illustrating a flow of processing of requesting and displaying the assistance information executed by terminal 300, 350 and HMI device 400.

First, terminal 300, 350 and HMI device 400 determine whether the occurrence of an abnormality has been notified from PLC 100 (step S1). When the notification has not been received (NO in step S1), the processing of requesting and displaying the assistance information returns to step S1.

When the notification has been received (YES in step S1), terminal 300, 350 and HMI device 400 request PLC 100 to provide the assistance information (step S2). In step S2, terminal 300, 350 and HMI device 400 specify the abnormality thus notified as the target abnormality.

Next, terminal 300, 350 and HMI device 400 determine whether the assistance information has been received from PLC 100 (step S3). When the assistance information has been received (YES in step S3), terminal 300, 350 and HMI device 400 display the assistance information thus received (step S4). When a notification that there is no assistance information has been received from PLC 100 (NO in step S3), terminal 300, 350 and HMI device 400 display the fact that there is no assistance information (step S5). After step S4 or step S5, the processing of requesting and displaying the assistance information is brought to an end.

Figure 12:
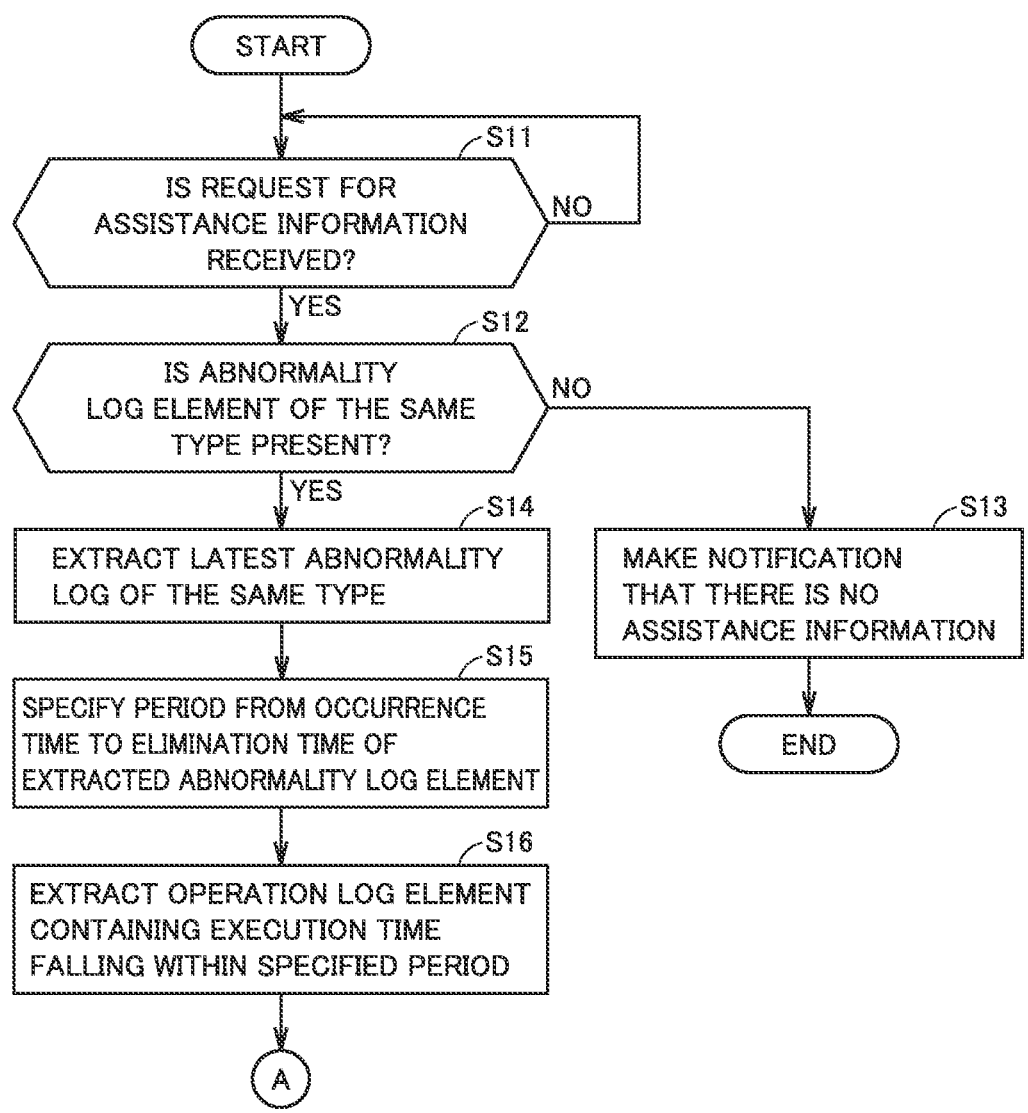
FIG. 12 is a flowchart illustrating the first half of processing of generating the assistance information executed by the PLC.

FIG. 12 is a flowchart illustrating the first half of processing of generating the assistance information executed by the PLC. FIG. 13 is a flowchart illustrating the second half of the processing of generating the assistance information executed by the PLC. Note that FIGS. 12 and 13 illustrate a flow of generating the assistance information in accordance with the second generation example described above.

First, in step S11, processor 102 of PLC 100 determines whether a request to provide the assistance information has been received from either terminal 300, 350 or HMI device 400. When the request to provide the assistance information has not been received (NO in step S11), the processing of generating the assistance information returns to step S11.

When the request to provide the assistance information has been received (YES in step S11), processor 102 determines whether abnormality history data 128 contains abnormality log element 129 containing type information 41 showing a type identical to the type of the specified target abnormality (step S12). When abnormality history data 128 contains no abnormality log element 129 of the same type as of the target abnormality (NO in step S12), processor 102 make a notification that there is no assistance information (step S13). After step S13, the processing of generating the assistance information is terminated.

When abnormality history data 128 contains abnormality log element 129 of the same type as of the target abnormality (YES in step S12), processor 102 extracts one abnormality log element 129 of the same type as of the target abnormality (step S14). When abnormality history data 128 contains a plurality of abnormality log elements 129 of the same type as of the target abnormality, processor 102 extracts latest abnormality log element 129 from the plurality of abnormality log elements 129. Next, processor 102 specifies a period from the occurrence time to elimination time of abnormality log element 129 thus extracted (step S15).

Next, processor 102 extracts all operation log elements 127 containing execution time 35 falling within the period thus specified from operation history data 126 (step S16).

Next, processor 102 determines whether source IDs 31 contained in all operation log elements 127 thus extracted are the same (step S17). When all the source IDs are the same (YES in step S17), processor 102 generates the assistance information based on all extracted operation log elements 127 (step S18).

When all the source IDs are not the same (NO in step S17), processor 102 determines whether there is abnormality log element 129 of the same type as of the target abnormality before abnormality log element 129 extracted in step S14 (step S19).

When there is no abnormality log element 129 of the same type before abnormality log element 129 extracted in step S14 (NO in step S19), the processing of generating the assistance information proceeds to step S20. In step S20, processor 102 determines a source identified by source ID 31 of last operation log element 127 (operation log element 127 containing the latest execution time) among operation log elements 127 extracted in step S16 as the narrowing key.

When there is abnormality log element 129 of the same type before abnormality log element 129 extracted in step S14 (YES in step S19), the processing of generating the assistance information proceeds to step S21. In step S21, processor 102 specifies operation log element 127 corresponding to an operation executed immediately before the elimination time of abnormality log element 129 of the same type before abnormality log element 129 extracted in step S14. That is, processor 102 specifies, for each abnormality log element 129, operation log element 127 containing execution time 35 earlier than and closest to the elimination time of abnormality log element 129.

Next, processor 102 determines a source serving as the narrowing key based on operation log element 127 thus specified (step S22). Specifically, when there is only one specified operation log element 127, processor 102 determines a source identified by source ID 31 of operation log element 127 as the narrowing key. When there is a plurality of specified operation log elements 127, processor 102 determines a source represented by source IDs 31 of the plurality of operation log elements 127 as the narrowing key. That is, a source that is the largest in number among the sources indicated by the source IDs of the plurality of operation log elements 127 is determined as the narrowing key. When there is a plurality of sources that are the largest in number, a source containing the latest execution time among the plurality of sources that are the largest in number is determined as the narrowing key.

Next, processor 102 narrows down operation log elements 127 extracted in step S16 based on the narrowing key determined in step S20 or step S22 (step S23). Processor 102 generates the assistance information based on operation log element 127 obtained as a result of the narrowing (step S24).

Processor 102 outputs the assistance information generated in step S18 or step S24 to the request source (step S25).

<D. Modification>

Figure 13:
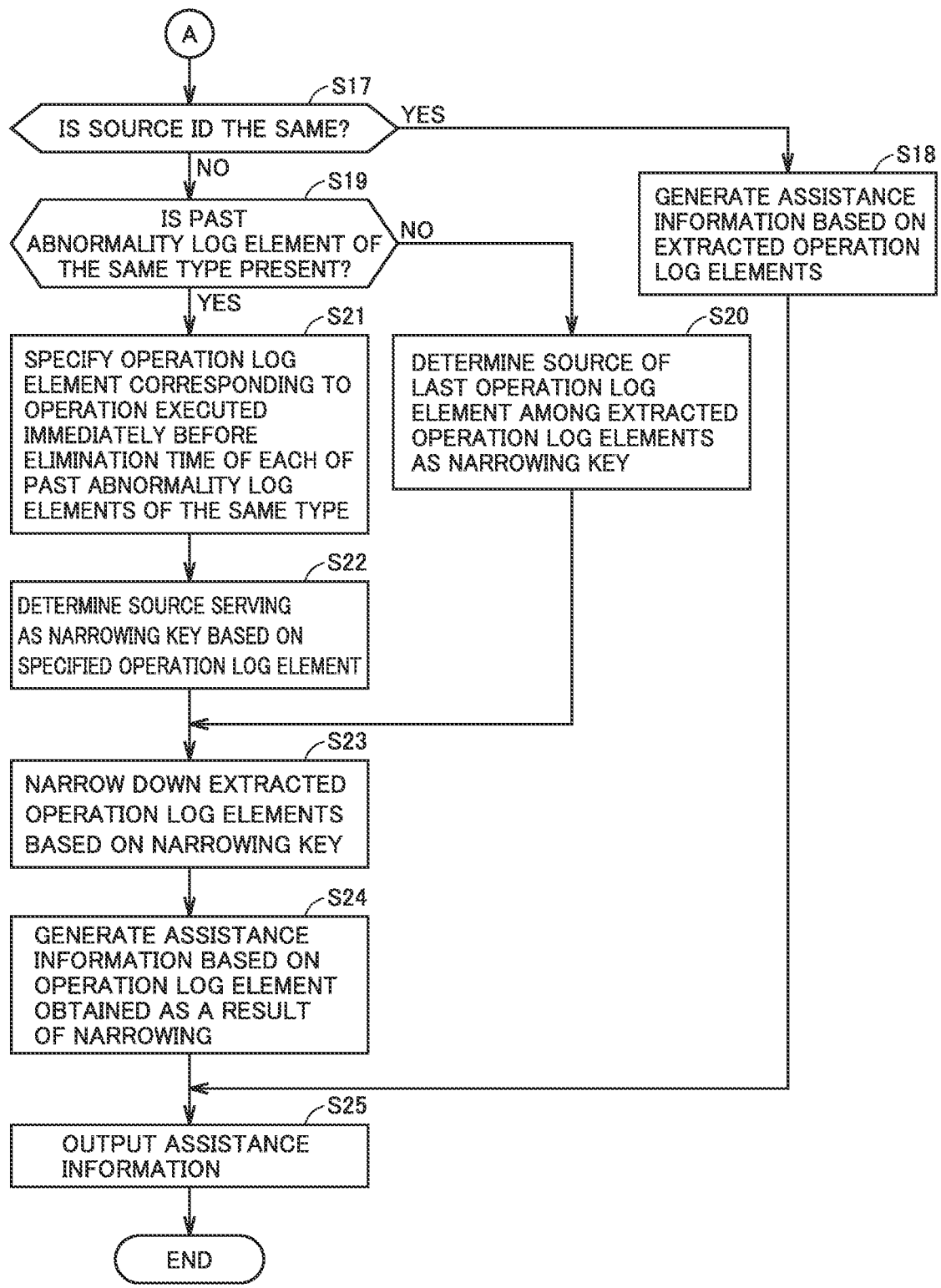
FIG. 13 is a flowchart illustrating the second half of processing of generating the assistance information executed by the PLC.

In an example illustrated in FIG. 13, the method for determining a source being the narrowing key is made different in a manner that depends on the determination result of step S19. Alternatively, step S19 may be omitted, and a source being the narrowing key may be determined by the method applied to step S20.

In step S20, processor 102 may determine a location identified by location ID 36 of last operation log element 127 (operation log element 127 containing the latest execution time) among operation log elements 127 extracted in step S16 as the narrowing key. Alternatively, in step S20, processor 102 may determine a user identified by user ID 37 of last operation log element 127 (operation log element 127 containing the latest execution time) among operation log elements 127 extracted in step S16 as the narrowing key.

In the above description, output unit 15 is provided in PLC 100. Alternatively, output unit 15 may be provided in a device (for example, a server) outside PLC 100. Accordingly, operation history data 126 and abnormality history data 128 may be stored in the device outside PLC 100. Operation history writing unit 12 and abnormality history writing unit 14 may also be provided in the device outside PLC 100.

<E. Actions and Effects>

As described above, PLC 100 that controls the control target includes PLC module group 13 that detects an abnormality in at least either control target or PLC 100, and operation command processor 11 that executes, upon receipt of an operation command, processing in accordance with the operation command. Control system SYS includes abnormality history writing unit 14, operation history writing unit 12, and output unit 15. In the example illustrated in FIG. 3, abnormality history writing unit 14, operation history writing unit 12, and output unit 15 are provided in PLC 100. For each abnormality detected by PLC module group 13, abnormality history writing unit 14 writes, to abnormality history data 128, abnormality log element 129 containing type information 41 showing the type of the abnormality, occurrence time 42 of the abnormality, and elimination time 43 of the abnormality. For each operation command received by operation command processor 11, operation history writing unit 12 writes, to operation history data 126, operation log element 127 containing content information 38 showing the details of the operation command and execution time 35 of processing executed in accordance with the operation command. Output unit 15 outputs assistance information for assisting elimination of the target abnormality detected by PLC module group 13. Output unit 15 extracts one abnormality log element 129 containing type information 41 showing a type identical to the type of the target abnormality from abnormality history data 128 as the target log element. Output unit 15 extracts, from operation history data 126, operation log element 127 containing execution time 35 falling within a period from occurrence time 42 to elimination time 43 contained in the target log element. Output unit 15 generates the assistance information based on operation log element 127 thus extracted.

Within a period from occurrence time 42 to elimination time 43 of past abnormality log element 129 containing type information 41 showing a type identical to the type of an abnormality of which the occurrence has been notified, an operation of eliminating the abnormality is executed. That is, operation log elements 127 containing execution time 35 falling within the period include operation log element 127 corresponding to the operation of eliminating the abnormality. This allows even a user (such as a worker or an observer) with limited knowledge and experience to easily eliminate the abnormality by referring to the assistance information.

Operation log element 127 contains transmission source identification information for identifying a transmission source of an operation command. The transmission source identification information contains, for example, at least one of source ID 31 for identifying a program that has generated the operation command, location ID 36 for identifying the location of a device that has transmitted the operation command, and user ID 37 for identifying a user that has transmitted the operation command. The assistance information is information containing content information 38 and transmission source identification information contained in extracted operation log element 127, content information 38 and the transmission source identification information being arranged in chronological order based on execution time 35.

This allows the user to easily check content information 38 associated with a desired transmission source based on the transmission source identification information among output content information 38. This further allows the user to easily understand the order of operations for eliminating the abnormality.

Output unit 15 narrows down extracted operation log elements 127 to operation log elements 127 containing the transmission source identification information for identifying the target transmission source (for example, the source ID "Tool" for identifying dedicated tool 30) and generates the assistance information based on operation log elements 127 obtained as a result of the narrowing.

This allows the user to easily check only the details of the operation associated with the target transmission source among the operations executed within the period from occurrence time 42 to elimination time 43 of past abnormality log element 129.

Output unit 15 specifies a transmission source identified by transmission source identification information (a source ID, a location ID, or a user ID) contained in operation log element 127 containing latest execution time 35 among extracted operation log elements 127 as the target transmission source.

Among extracted operation log elements 127, operation log element 127 containing latest execution time 35 corresponds to an operation that is executed immediately before the elimination time of the target abnormality and is thus highly probable to be an operation executed to eliminate the target abnormality. A transmission source identified by transmission source identification information (a source ID, a location ID, or a user ID) contained in operation log element 127 is specified as the target transmission source. This allows the user to easily check only the operation that is highly probable to have been executed to eliminate the abnormality among extracted operation log elements 127.

Output unit 15 selects at least one abnormality log element 129 that is different from the target log element and contains type information 41 showing a type identical to the type of the target abnormality from abnormality history data 128. For each of at least one abnormality log element 129 thus selected, output unit 15 selects, from operation history data 126, operation log element 127 containing execution time 35 that is earlier than and closest to elimination time 43 contained in abnormality log element 129. Output unit 15 specifies a source represented by source ID contained in operation log element 127 as the target transmission source.

This allows the user to check only the details of operation log element 127 containing a source ID identical to the source of the operation executed immediately before the elimination time of the past target abnormality. As described above, the operation executed immediately before the elimination time of the target abnormality is highly probable to be an operation executed to eliminate the target abnormality. This allows the user to easily check only the operation that is highly probable to have been executed to eliminate the abnormality among extracted operation log elements 127.

When there is a plurality of abnormality log elements 129 containing type information 41 showing a type identical to the type of the target abnormality in abnormality history data 128, the output unit extracts latest abnormality log element 129 from the plurality of abnormality log elements 129 as the target log element.

This allows the user to easily check the details of the operation recently executed to eliminate the target abnormality.

<F. Appendix>

As described above, the present embodiment and modifications include the following disclosure.

(Configuration 1)

A control system (SYS) comprising:

a programmable logic controller (100) configured to control a control target, the programmable logic controller (100) including an abnormality detector (13) configured to detect an abnormality in at least either the control target or the programmable logic controller (100), and a command processor (11) configured to execute, upon receipt of an operation command, processing in accordance with the operation command;

a first writing unit (14) configured to write, for each abnormality detected by the abnormality detector (13), a first log element (129) containing type information (41) showing a type of the abnormality, an occurrence time (42) of the abnormality, and an elimination time (43) of the abnormality to first history data (128);

a second writing unit (12) configured to write, for each operation command received by the command processor (11), a second log element (127) containing content information (38) showing details of the operation command and an execution time (35) of processing executed in accordance with the operation command to second history data (126); and an output unit (15) configured to output assistance information for assisting elimination of a target abnormality detected by the abnormality detector (13).

The output unit (15) extracts, from the first history data (128), one first log element (129) containing the type information showing a type identical to a type of the target abnormality as a target log element, extracts, from the second history data (126), second log elements (127) containing the execution time (35) falling within a period from the occurrence time to the elimination time contained in the target log element, and generates the assistance information based on the second log elements (127) extracted.

(Configuration 2)

In the control system (SYS) according to configuration 1, the second log element (127) contains transmission source identification information (31, 36, 37) for identifying a transmission source of the operation command, and the assistance information is information containing the content information (38) and the transmission source identification information (31, 36, 37) contained in each of the second log elements (127) extracted, the content information (38) and the transmission source identification information (31, 36, 37) being arranged in chronological order based on the execution time (35).

(Configuration 3)

In the control system (SYS) according to configuration 1, the second log element (127) contains transmission source identification information (31, 36, 37) for identifying a transmission source of the operation command, and the output unit (15) narrows down the second log elements (127) extracted to a second log element (127) containing the transmission source identification information (31, 36, 37) for identifying a target transmission source and generates the assistance information based on the second log element (127) obtained as a result of the narrowing.

(Configuration 4)

In the control system (SYS) according to configuration 3, the output unit (15) specifies, as the target transmission source, a transmission source identified by the transmission source identification information (31, 36, 37) contained in a second log element (127) containing the execution time (35) latest among the second log elements (127) extracted.

(Configuration 5)

In the control system (SYS) according to configuration 3, the output unit (15) selects, from the first history data (128), at least one first log element (129) that is different from the target log element extracted and contains the type information showing a type identical to a type of the target abnormality, selects, for each of the at least one first log element (129), a second log element (127) from the second history data (126), the second log element (127) containing the execution time (35) earlier than and closest to the elimination time (43) contained the first log element, and specifies a transmission source represented by the transmission source identification information (31, 36, 37) contained in the second log element (127) selected as the target transmission source.

(Configuration 6)

In the control system (SYS) according to any one of configurations 3 to 5, the assistance information is information containing the content information (38) contained in the second log elements (127) obtained as a result of the narrowing, the content information (38) being arranged in chronological order based on the execution time (35).

(Configuration 7)

In the control system (SYS) according to any one of configurations 2 to 6, the transmission source identification information (31, 36, 37) identifies at least one of a program that has generated the operation command, a location of a device that has transmitted the operation command, and a user that has transmitted the operation command.

(Configuration 8)

In the control system (SYS) according to any one of configurations 1 to 7, when there is a plurality of first log elements (129) each containing the type information (41) showing a type identical to the type of the target abnormality in the first history data (128), the output unit (15) extracts a latest first log element (129) from the plurality of first log elements (129) as the target log element.

(Configuration 9)

A programmable logic controller (100) that controls a control target, including:

an abnormality detector (13) configured to detect an abnormality in at least either the control target or the programmable logic controller (100);

a command processor (11) configured to execute, upon receipt of an operation command, processing in accordance with the operation command;

a first writing unit (14) configured to write, for each abnormality detected by the abnormality detector (13), a first log element (129) containing type information showing a type of the abnormality, an occurrence time of the abnormality, and an elimination time of the abnormality to first history data (128);

a second writing unit (12) configured to write, for each operation command received by the command processor (11), a second log element (127) containing content information showing details of the operation command and an execution time of processing executed in accordance with the operation command to second history data (126); and an output unit (15) configured to output assistance information for assisting elimination of a target abnormality detected by the abnormality detector (13).

The output unit (15) extracts, from the first history data (128), one first log element (129) containing the type information showing a type identical to a type of the target abnormality as a target log element, extracts, from the second history data (126), second log elements (127) containing the execution time falling within a period from the occurrence time to the elimination time contained in the target log element, and generates the assistance information based on the second log elements (127) extracted.

(Configuration 10)

An information processing method applied to a control system (SYS) including a programmable logic controller (100) that controls a control target, the programmable logic controller (100) including an abnormality detector (13) configured to detect an abnormality in at least either the control target or the programmable logic controller, and a command processor (11) configured to execute, upon receipt of an operation command, processing in accordance with the operation command, the information processing method including:

writing, for each abnormality detected by the abnormality detector (13), a first log element (129) containing type information showing a type of the abnormality, an occurrence time of the abnormality, and an elimination time of the abnormality to first history data (128);

writing, for each operation command received by the command processor (11), a second log element (127) containing content information showing details of the operation command and an execution time of processing executed in accordance with the operation command to second history data (126); and outputting assistance information for assisting elimination of a target abnormality detected by the abnormality detector (13).

The outputting includes extracting, from the first history data (128), a first log element (129) containing the type information showing a type identical to a type of the target abnormality as a target log element, extracting, from the second history data (126), second log elements (127) containing the execution time falling within a period from the occurrence time to the elimination time contained in the target log element, and generating the assistance information based on the second log elements (127) extracted.

Although the embodiments of the present invention have been described, it should be understood that the embodiments disclosed herein are illustrative in all respects and not restrictive. The scope of the present invention is set forth by the claims, and the present invention is intended to include the claims, equivalents of the claims, and all modifications within the scope.

REFERENCE SIGNS LIST

11: operation command processor, 12: operation history writing unit, 13: PLC module group, 14: abnormality history writing unit, 15: output unit, 16: retrieval unit, 17: assistance information generator, 18: status register, 21 to 26: field, 30: dedicated tool, 31: source ID, 32: function ID, 33: resource name, 34: data name, 35: execution time, 36: location ID, 37: user ID, 38: content information, 40: HMI program, 41: type information, 42: occurrence time, 43: elimination time, 50, 50*a*: screen, 51 to 53: input field, 60, 60*a*: list, 100: PLC, 102: processor, 104: main memory, 106: first network controller, 108: second network controller, 110: storage, 112: memory card interface, 114: memory card, 116: local bus controller, 118: processor bus, 120: USB controller, 122: system program, 124: control program, 126: operation history data, 127, 127B, 127C: operation log element, 127A: operation log element group, 128: abnormality history data, 129, 129A to 129C, 129*a*, 129*z*: abnormality log element, 130: third network controller, 200: support device, 300, 350: terminal, 400: HMI device, SYS: control system

The invention claimed is:

1. A control system comprising:
a programmable logic controller configured to control a control target, the programmable logic controller including an abnormality detector configured to detect an abnormality in at least either the control target or the programmable logic controller, and a command processor configured to execute, upon receipt of an operation command, processing in accordance with the operation command;
a first writing unit configured to write, for each abnormality detected by the abnormality detector, a first log element containing type information showing a type of the abnormality, an occurrence time of the abnormality, and an elimination time of the abnormality to first history data;
a second writing unit configured to write, for each operation command received by the command processor, a second log element containing content information showing details of the operation command and an execution time of processing executed in accordance with the operation command to second history data; and
an output unit configured to output assistance information for assisting elimination of a target abnormality detected by the abnormality detector, wherein
the output unit extracts, from the first history data, one first log element containing the type information showing a type identical to a type of the target abnormality as a target log element, extracts, from the second history data, second log elements containing the execution time falling within a period from the occurrence time to the elimination time contained in the target log element, and generates the assistance information based on the second log elements extracted.

2. The control system according to claim 1, wherein
the second log element contains transmission source identification information for identifying a transmission source of the operation command, and
the assistance information is information containing the content information and the transmission source identification information contained in each of the second log elements extracted, the content information and the transmission source identification information being arranged in chronological order based on the execution time.

3. The control system according to claim 1, wherein
the second log element contains transmission source identification information for identifying a transmission source of the operation command, and
the output unit narrows down the second log elements extracted to a second log element containing the transmission source identification information for identifying a target transmission source and generates the assistance information based on the second log element obtained as a result of the narrowing.

4. The control system according to claim 3, wherein
the output unit specifies, as the target transmission source, a transmission source identified by the transmission source identification information contained in a second log element containing the execution time latest among the second log elements extracted.

5. The control system according to claim 3, wherein
the output unit selects, from the first history data, at least one first log element that is different from the target log element extracted and contains the type information showing a type identical to a type of the target abnormality, selects, for each of the at least one first log element, a second log element from the second history data, the second log element containing the execution time earlier than and closest to the elimination time contained the first log element, and specifies a transmission source represented by the transmission source identification information contained in the second log element selected as the target transmission source.

6. The control system according to claim 3, wherein
the assistance information is information containing the content information contained in the second log elements obtained as a result of the narrowing, the content information being arranged in chronological order based on the execution time.

7. The control system according to claim 2, wherein
the transmission source identification information identifies at least one of a program that has generated the operation command, a location of a device that has transmitted the operation command, and a user that has transmitted the operation command.

8. The control system according claim 1, wherein
when there is a plurality of first log elements each containing the type information showing a type identical to the type of the target abnormality in the first history data, the output unit extracts a latest first log element from the plurality of first log elements as the target log element.

9. A programmable logic controller that controls a control target, comprising:
an abnormality detector configured to detect an abnormality in at least either the control target or the programmable logic controller;
a command processor configured to execute, upon receipt of an operation command, processing in accordance with the operation command;
a first writing unit configured to write, for each abnormality detected by the abnormality detector, a first log element containing type information showing a type of the abnormality, an occurrence time of the abnormality, and an elimination time of the abnormality to first history data;
a second writing unit configured to write, for each operation command received by the command processor, a second log element containing content information showing details of the operation command and an execution time of processing executed in accordance with the operation command to second history data; and
an output unit configured to output assistance information for assisting elimination of a target abnormality detected by the abnormality detector, wherein
the output unit extracts, from the first history data, one first log element containing the type information showing a type identical to a type of the target abnormality as a target log element, extracts, from the second history data, second log elements containing the execution time falling within a period from the occurrence time to the elimination time contained in the target log element, and generates the assistance information based on the second log elements extracted.

10. An information processing method applied to a control system including a programmable logic controller that controls a control target, the programmable logic controller including an abnormality detector configured to detect an abnormality in at least either the control target or the programmable logic controller, and a command processor configured to execute, upon receipt of an operation command, processing in accordance with the operation command, the information processing method comprising:
writing, for each abnormality detected by the abnormality detector, a first log element containing type information showing a type of the abnormality, an occurrence time of the abnormality, and an elimination time of the abnormality to first history data;
writing, for each operation command received by the command processor, a second log element containing content information showing details of the operation command and an execution time of processing executed in accordance with the operation command to second history data; and
outputting assistance information for assisting elimination of a target abnormality detected by the abnormality detector, wherein
the outputting includes extracting, from the first history data, a first log element containing the type information showing a type identical to a type of the target abnormality as a target log element, extracting, from the second history data, second log elements containing the execution time falling within a period from the occurrence time to the elimination time contained in the target log element, and generating the assistance information based on the second log elements extracted.

11. The information processing method according to claim 10, wherein
the second log element contains transmission source identification information for identifying a transmission source of the operation command, and
the assistance information is information containing the content information and the transmission source identification information contained in each of the second log elements extracted, the content information and the transmission source identification information being arranged in chronological order based on the execution time.

12. The information processing method according to claim 10, wherein
the second log element contains transmission source identification information for identifying a transmission source of the operation command, and
the outputting includes:
narrowing down the second log elements extracted to a second log element containing the transmission source identification information for identifying a target transmission source; and
generating the assistance information based on the second log element obtained as a result of the narrowing.

13. The information processing method according to claim 12, wherein
the outputting includes specifying, as the target transmission source, a transmission source identified by the transmission source identification information contained in a second log element containing the execution time latest among the second log elements extracted.

14. The information processing method according to claim 12, wherein
the outputting includes:
selecting, from the first history data, at least one first log element that is different from the target log element extracted and contains the type information showing a type identical to a type of the target abnormality;
selecting, for each of the at least one first log element, a second log element from the second history data, the second log element containing the execution time earlier than and closest to the elimination time contained the first log element; and
specifying a transmission source represented by the transmission source identification information contained in the second log element selected as the target transmission source.

15. The information processing method according to claim 12, wherein
the assistance information is information containing the content information contained in the second log elements obtained as a result of the narrowing, the content information being arranged in chronological order based on the execution time.

16. The information processing method according to claim 11, wherein
the transmission source identification information identifies at least one of a program that has generated the operation command, a location of a device that has transmitted the operation command, and a user that has transmitted the operation command.

17. The information processing method according to claim 10, wherein
when there is a plurality of first log elements each containing the type information showing a type identical to the type of the target abnormality in the first history data, the outputting includes extracting a latest first log element from the plurality of first log elements as the target log element.

* * * * *